(12) United States Patent
H R et al.

(10) Patent No.: US 11,165,750 B1
(45) Date of Patent: Nov. 2, 2021

(54) FLEXIBLE SERVICES-BASED PIPELINE FOR FIREWALL FILTER PROCESSING

(71) Applicant: Juniper Networks, Inc., Sunnyvale, CA (US)

(72) Inventors: Sandeep H R, Sunnyvale, CA (US); Rajat Rastogi, Bangalore (IN); Vinod B C, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 291 days.

(21) Appl. No.: 16/369,639

(22) Filed: Mar. 29, 2019

(51) Int. Cl.
  *G06F 9/00* (2006.01)
  *G06F 15/16* (2006.01)
  *G06F 17/00* (2019.01)
  *H04L 29/06* (2006.01)

(52) U.S. Cl.
  CPC ...... *H04L 63/0263* (2013.01); *H04L 63/0209* (2013.01); *H04L 63/123* (2013.01); *H04L 63/1408* (2013.01); *H04L 63/20* (2013.01)

(58) Field of Classification Search
  CPC ............. H04L 63/0263; H04L 63/1408; H04L 63/123; H04L 63/0209; H04L 63/20
  See application file for complete search history.

(56) References Cited

U.S. PATENT DOCUMENTS

| | | |
|---|---|---|
| 6,484,261 B1 | 11/2002 | Wiegel |
| 7,143,439 B2 | 11/2006 | Cooper et al. |
| 7,518,986 B1 | 4/2009 | Chadalavada et al. |
| 7,685,271 B1 | 3/2010 | Schneider et al. |
| 7,739,403 B1 | 6/2010 | Balakrishnan et al. |
| 7,747,999 B1* | 6/2010 | Eng .................. H04L 41/0873 717/174 |
| 2004/0268150 A1* | 12/2004 | Aaron ............... H04L 63/0263 726/11 |
| 2005/0262554 A1 | 11/2005 | Brooks et al. |

(Continued)

OTHER PUBLICATIONS

U.S. Appl. No. 15/198,912, filed Jun. 30, 2016, Juniper Networks, Inc. (inventor Srinivasan et al.), entitled "Hierarchical Naming Scheme for State Propagation Within Network Devices".

(Continued)

*Primary Examiner* — Amie C. Lin
(74) *Attorney, Agent, or Firm* — Shumaker & Sieffert, P.A.

(57) ABSTRACT

In general, techniques are described for creating a flexible services-based pipeline for firewall filter processing. A network device may be configured to perform the techniques. In one example, a method includes receiving, by a network device, data defining a plurality of firewall filter processing services, the data defining an order in which to apply services of the plurality of firewall filter processing services to firewall filters; configuring, by the network device and based on the received data, an execution engine pipeline to include the plurality of firewall filter processing services in the defined order; prior to programming a received firewall filter to hardware of the network device for filtering network traffic, processing the firewall filter by the execution engine pipeline to produce a processed firewall filter; and programming, by the network device, the processed firewall filter to the hardware for filtering the network traffic.

20 Claims, 7 Drawing Sheets

(56) References Cited

U.S. PATENT DOCUMENTS

2017/0005986 A1* 1/2017 Bansal ............... H04L 63/0218
2017/0317979 A1* 11/2017 Bansal ............... H04L 63/0263

OTHER PUBLICATIONS

"FireMon Products" FireMon LLC, Aug. 2013, available at https://www.firemon.com/products/, last accessed Mar. 29, 2019,7 pp.

"FireMon Policy Optimizer" FireMon LLC, Sep. 2014, available at https://www.firemon.com/products/policy-optimizer/, last accessed Mar. 29, 2019, 9 pp.

"FireMon Security Manager" FireMon LLC, Jul. 2014, available at https://www.firemon.com/products/security-manager/, last accessed Mar. 29, 2019, 11 pp.

"FireMon Policy Optimizer" FireMon LLC, Jun. 18, 2014, available at https://www.youtube.com/watch?v=qc7IP3bv89w, last accessed Mar. 29, 2019, 1 p.

"Skybox Firewall Assurance" Skybox Security, Jun. 2016 available at https://www.skyboxsecurity.com/products/skybox-firewall-assurance, last accessed Mar. 29, 2019, 8 pp.

"Configuration Example—Optimizing Application Firewall ruleset on the SRX device" Juniper Networks, Inc., Aug. 24, 2016, available at https://kb.juniper.net/InfoCenter/index?page=content&id=KB31096, last accessed Mar. 29, 2019, 1 p.

* cited by examiner

FLEXIBLE SERVICES-BASED PIPELINE FOR FIREWALL FILTER PROCESSING

TECHNICAL FIELD

The disclosure relates to network devices and, more particularly, to configuring and processing firewall filters in network devices.

BACKGROUND

Due to increasing reliance on network-accessible computers, network security has become a major issue for organizations and individuals. To help ensure the security of their computers, organizations and individuals frequently install security devices between public networks and their private networks. A goal of such security devices is to prevent unwanted or malicious information from the public network from affecting devices in the private network.

These security devices are commonly referred to as firewall. Typically, the firewall is a dedicated device that is configured to permit or deny traffic flows based on an organization's security policies. Typical high-end firewalls provide packet forwarding by dynamically load-balancing packet flows to a set of service cards. These service cards provide flow-based security services, such as flow blocking, network address translation (NAT), anti-virus (AV) scanning and detection, intrusion detection protection (IDP) and/or any other security services. The firewall typically intercepts packets entering and leaving the private network, and processes the packets with the service cards to determine whether to permit or deny the packet based on information included within each packet that may define a state of a flow associated with the packet.

One of the ways to implement firewalls is through filters. Each filter contains terms, where each term contains match conditions and actions. Firewall filters may be configured on the firewall, e.g., through user input. A user may have difficulty defining firewall filters, such as defining invalid combinations, redundant terms, irrelevant terms and the like.

SUMMARY

Techniques are described for creating a flexible services-based pipeline for firewall filter processing. The techniques of this disclosure provide a firewall filter processing engine that pre-processes the firewall filters (e.g., before they are written to hardware). An execution engine provides a platform for one or more user-configurable firewall filter processing pipelines. In accordance with the techniques, a user can define the filter processing pipeline on the execution engine as a chain of services, with firewall requirements grouped into the services. Each group is referred to as a stage. Example firewall filter processing services that may be included in a configured firewall filter processing pipeline include one or more of a firewall filter validation service, a firewall filter optimization service, a firewall filter comparison service, and a firewall filter conversion service.

According to the techniques of the disclosure, the network device described herein provides a user interface having a command syntax that allows a user to select particular stages to create a flexible services-based pipeline for firewall filter processing. In some examples, the user may select the stages, representing different types of firewall filter processing services, from among several services stages available from a service library. Moreover, the user can define a pipeline to create a customized execution engine that operates on received firewall filters. Firewall filters will then be processed through the pipeline of the execution engine before the firewall filters are programmed to hardware and applied to network traffic.

In some examples, the network device providing the user interface and the network device that applies the processed firewall filters to network traffic may be different network devices. In other examples, the network devices are separate sub-components of an overall system, such as physically distinct chassis of a multi-chassis router. In some examples, the techniques of this disclosure may be implemented as part of a distributed operating system. The operating system may be distributed across computing nodes (which may also be referred to as "hardware computing nodes," "computing nodes" or "nodes"), which may include routing engines, interface cards, service cards, forwarding components, as well as non-networking nodes, such as processors, central processing units (CPUs), application specific integrated circuits (ASICs), graphical processing units (GPUs).

The techniques of the disclosure may provide one or more advantages. For example, the techniques of the disclosure provide an approach that is highly modular, flexible, easily maintainable, less error-prone, and highly scalable. The user can define the pipeline to include a chain of services for a filter processing pipeline that can fork into multiple services. The ability to select services and sub-services make the system modular and highly scalable. The services may be tailored for the particular hardware, such as by omitting particular services not necessary for certain hardware platforms. For example, the firewall filter processing services may eliminate redundant filter terms in hardware so as not to consume resources unnecessarily. The system can address situations in which a user may configure a filter which may contain invalid combinations of match conditions and actions, where some hardware platforms may not support some of the match conditions and actions, where the user may configure some terms which may be redundant, where the user may configure some terms which are always match irrespective of traffic, and where the user may configure some terms that always miss.

In one example, a method includes receiving, by a network device, data defining a plurality of firewall filter processing services, the data defining an order in which to apply services of the plurality of firewall filter processing services to firewall filters; configuring, by the network device and based on the received data, an execution engine pipeline to include the plurality of firewall filter processing services in the defined order; prior to programming a received firewall filter to hardware of the network device for filtering network traffic, processing the firewall filter by the execution engine pipeline to produce a processed firewall filter; and programming, by the network device, the processed firewall filter to the hardware for filtering the network traffic.

In another example, a network device includes a plurality of hardware computing nodes configured to execute a distributed operating system, at least one of the plurality of hardware computing nodes configured to: receive data defining a plurality of firewall filter processing services, the data defining an order in which to apply services of the plurality of firewall filter processing services to firewall filters; configure, based on the received data, an execution engine pipeline to include the plurality of firewall filter processing services in the defined order; prior to programming a received firewall filter to hardware of the network device for filtering network traffic, process the firewall filter by the execution engine pipeline to produce a processed firewall filter; and program the processed firewall filter to the hardware for filtering the network traffic.

In a further example, a non-transitory computer-readable storage medium comprises instructions stored thereon that, when executed, cause one or more processors of a network device to: receive data defining a plurality of firewall filter processing services, the data defining an order in which to apply services of the plurality of firewall filter processing services to firewall filters; configure, based on the received data, an execution engine pipeline to include the plurality of firewall filter processing services in the defined order; prior to programming a received firewall filter to hardware of the network device for filtering network traffic, process the firewall filter by the execution engine pipeline to produce a processed firewall filter; and program the processed firewall filter to the hardware for filtering the network traffic.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
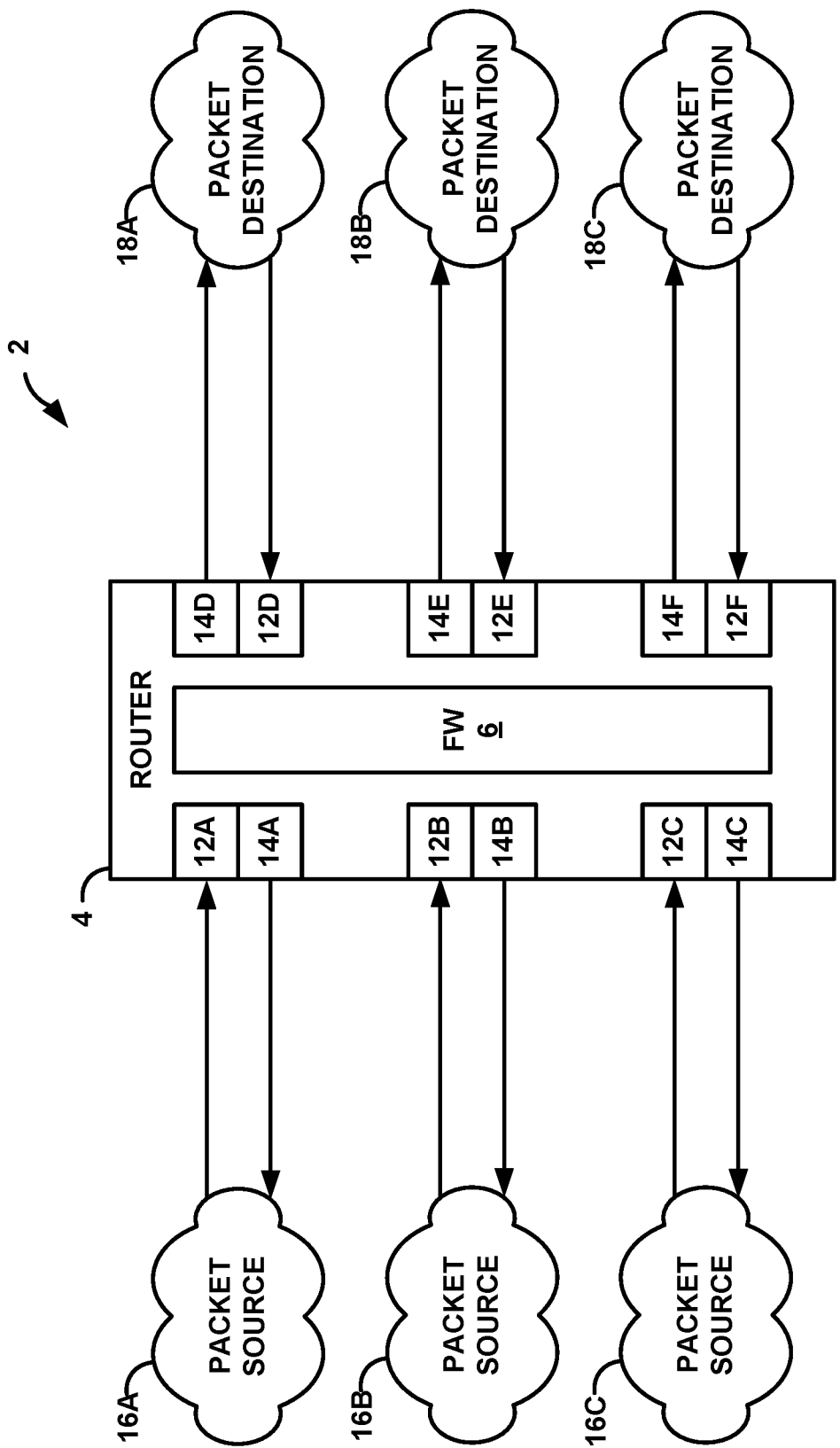
FIG. 1 is a block diagram illustrating an example network environment in which an example router, which may represent any routing device, includes an integrated firewall.

FIG. 1 is a block diagram illustrating an example network environment 2 in which an example router 4, which may represent any routing device, includes an integrated firewall 6. In this example, firewall 6 provides firewall services that allow security policies to be defined and applied on the different network interfaces of the router. In the example of FIG. 1, router 4 includes incoming interfaces 12A-12F (collectively, "incoming interfaces 12") and outgoing interfaces 14A-14F (collectively, "outgoing interfaces 14") for sending and receiving traffic and action requests to and from packet sources 16A-16C (collectively, "packet sources 16") and packet destinations 18A-18C (collectively, "packet destinations 18") via physical network links. For example, router 4 may provide a user interface that allows a user to configure firewall filters to be applied by firewall 6 to traffic communicated between packet sources 16 and packet destinations 18. In addition, the user interface supports defining a flexible services-based pipeline for processing the firewall filters prior to the firewall filters being applied by firewall 6.

In general, router 4 transports communications (e.g., packets) between packet sources 16 and packet destinations 18. Although only router 4 is shown in FIG. 1, network environment 2 may be interconnected with internal routers and other network devices via high-speed network links as part of a network, such as a service provider network.

Router 4 includes an integrated firewall 6 having incoming interfaces 12A-12N and outgoing interfaces 14A-14N, which may be physical interfaces coupled to a plurality of links that connect the firewall 6 to packet sources 16 and packet destinations 18. Firewall 6 may provide firewall services that allow security policies to be defined and applied by router 4. Although described for purposes of example in terms of a router 4 having an integrated firewall, the techniques of this disclosure may be applied to a firewall device without full router functionality, in some examples. The techniques of this disclosure may be applied to any networking device where firewall functionality is desired.

In general, firewall 6 intercepts traffic flows being communicated between networks, and may permit or deny those traffic flows based on security policies and based on information included within each packet of the traffic flows. Router 4 includes incoming interfaces 12 and outgoing interfaces 14 (i.e., physical or logical interfaces)

As described herein, router 4 may provide a user interface that allows a user, such as a network administrator, to configure router 4 to by selecting stages of a flexible services-based pipeline for firewall filter processing. In some examples, the user may select the stages, representing different types of firewall filter processing services, from among several services stages available from a service library. The user can define a pipeline to create a customized execution engine that operates on received firewall filters. Firewall filters will then be processed through the pipeline of the execution engine before the firewall filters are programmed to hardware and applied to network traffic.

In some examples, firewall 6 of router 4 may provide flow-based security services, such as flow blocking, network address translation (NAT), anti-virus (AV) scanning and detection, intrusion detection protection (IDP) and/or any other security services. In some examples, firewall 6 may implement a filter that defines one or more actions to be performed when a packet is received that matches at least one criterion of a set of criteria corresponding to the filter. For example, each criteria of the set of criteria may represent Boolean decisions (e.g., match or no match). When router 4 receives a packet, firewall 6 may evaluate the packet to determine whether the packet matches or does not match each criterion of the set of criteria. If the packet matches a respective criterion, the firewall 6 may execute an action corresponding to the respective criterion. Example actions including packet filtering, packet logging, intrusion detection and prevention, virus scanning, network address translation (NAT), policy-based authentication, and the like.

Firewall filters may be configured on firewall 6, e.g., through user input. A user may define firewall filters with invalid match condition combinations, redundant terms, irrelevant terms, etc. In accordance with the techniques of this disclosure, router 4 includes a firewall filter processing engine that processes the firewall filters (e.g., before they are written to hardware), such as by eliminating redundant filter terms in hardware so as not to consume resources.

In some examples, firewall requirements are grouped into different services. A particular group is also referred as pipeline stage. The overall pipeline is known as execution engine. A user can define the services-based pipeline for firewall filter processing as a chain of services. A chain of services for a filter processing pipeline can also fork into multiple services. Services and subservices make this configurable execution engine highly scalable. The services may be tailored for the particular hardware and in a modular way.

Based on the use case, certain groups (services) are selected and added in certain order one after the another to form filter processing pipeline. Overall input filter requirements are fed to this pipeline and get converted to very efficient resource-optimized filter. While processing the filter, if any pipeline stage fails, the processing is aborted, and failure is reported.

The techniques of the disclosure may provide one or more advantages. For example, the techniques of the disclosure provide an approach that is highly modular, flexible, easily maintainable, less error-prone, and highly scalable. The system can address situations in which a user may misconfigure the firewall rules. For example, the system can address situations in which a user may configure a filter which may contain invalid combinations of match conditions and actions, where some hardware platforms may not support some of the match conditions and actions, where the user may configure some terms which may be redundant, where the user may configure some terms which are always match irrespective of traffic, some terms that may never match any traffic, and where the user may configure some terms that always miss. Processing the firewall filters by the execution engine before publishing the firewall filters for programming to device hardware can conserve computing resources such as memory and CPU processing.

The user has the option to choose any of the services when configuring the execution engine. Any service can be added to or removed from the execution engine pipeline based on the user's requirements. If certain services are not needed by a user, the user can remove the service which can save CPU processing cycles and leave more CPU resources for existing services, thereby making the system more optimal and scalable.

Figure 2:
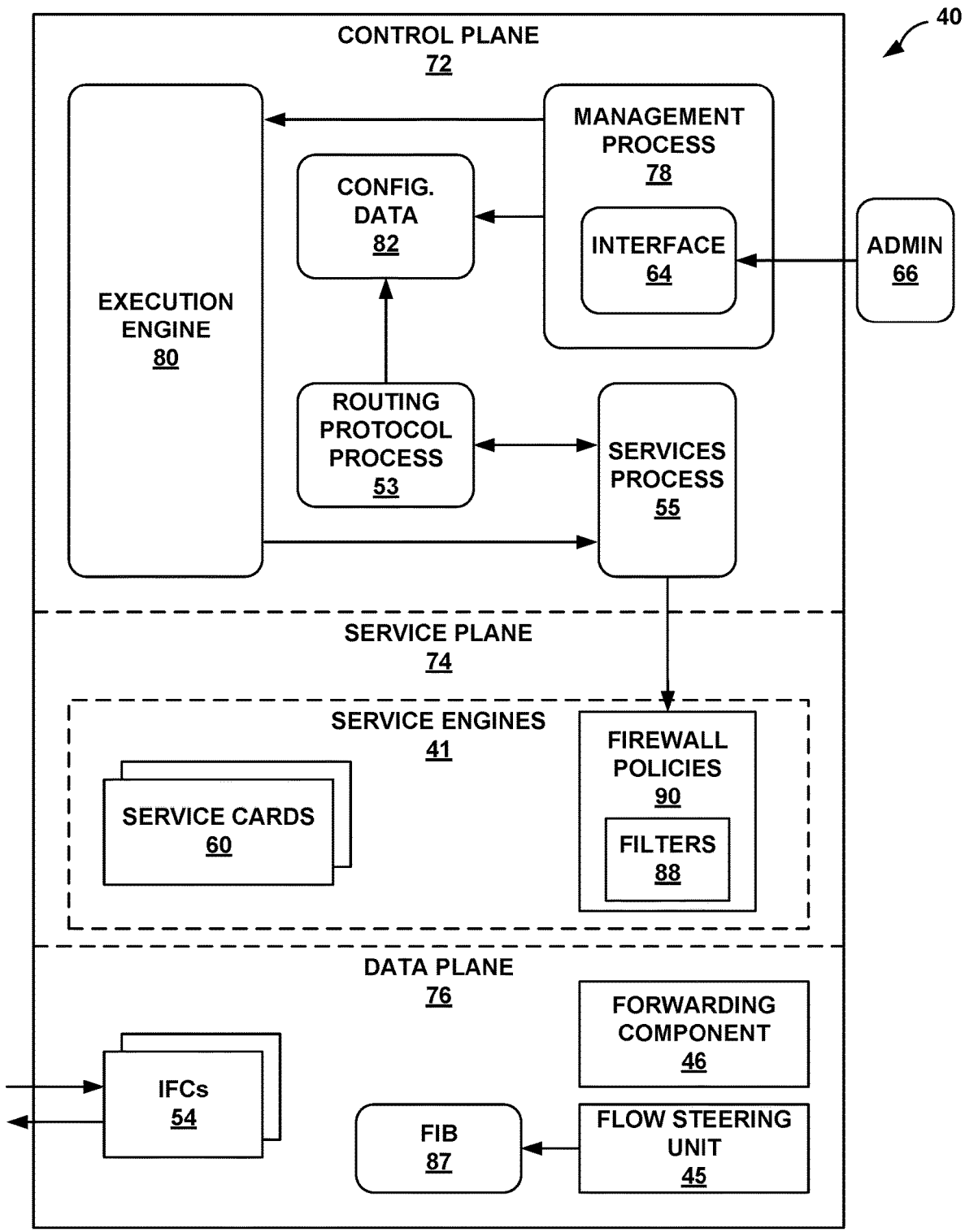
FIG. 2 is a block diagram illustrating a logical abstraction of an example router, in accordance with aspects of the techniques of this disclosure.

FIG. 2 is a block diagram illustrating a logical abstraction of an example router 40, in accordance with aspects of the techniques of this disclosure. In this example, routing and services are integrated within a single router 40 that uses a shared forwarding component 46 suitable for high-speed forwarding functions required by routers that process high-volume traffic, such as router 4 of FIG. 1. The operation of router 40 can be viewed as segmented into a control plane 72, service plane 74, and data plane 76. In some examples, some or all of the control plane 72 may be provided by a routing component, such as a routing engine. Control plane 72 includes one or more software processes, such as a management process 78 and a routing protocol process 53 executing on a computing environment provided by one or more microprocessors. Control plane 72 also includes an execution engine 80 that provides a pipeline of firewall filter processing services, in accordance with the techniques of this disclosure.

Routing protocol process 53 maintains a routing information base (RIB) (not shown) to reflect a current topology of a network and other network entities to which router 40 is connected. Routing protocol process 53 periodically updates the RIB to accurately reflect the topology of the network and other entities. In accordance with the RIB, forwarding component 46 maintains forwarding information base (FIB) 87 that associates network destinations with specific next hops and corresponding interface ports. For example, Routing protocol process 53 analyzes the RIB and generates FIB 87 in accordance with the RIB. Router 40 includes interface cards 54A-54N ("IFCs 54") that receive and send packets via network links. IFCs 54 may be coupled to network links via a number of interface ports. Forwarding component 46 may comprise a switch fabric to forward the packets to the interface cards based on the selected next hops.

Generally, forwarding component 46 may relay certain packets received from IFCs 54 to service cards 60. Specifically, forwarding component 46 may include a flow steering unit 45 to selectively direct packets to service engines 41 for processing. For example, flow steering unit 45 receives incoming packet flows and determines whether to send the packets through the service engines 41 for processing within one or more of service cards 60, or whether to bypass the service engines 41.

Service cards 60 receive packets from forwarding component 46, selectively provide services in accordance with firewall policies 90, and relay the packet or any response packets for forwarding by forwarding component 46 in accordance with FIB 87. Firewall policies 90 may include filters 88. Several input and output logical interfaces may couple service cards 60 to data plane 76 and control plane 72.

Service cards 60 having service engines 41 may be installed along a backplane or other interconnect of router 40 to perform a variety of firewall services on the packets received from forwarding component 46, such as filtering, logging, Intrusion Detection and Prevention (IDP) analysis, virus scanning, deep packet inspection. In some cases, a service card 60 may issue commands to dynamically configure a flow table within flow steering unit 45 of forwarding component 46. For example, flow steering unit 45 receives a packet and analyzes the received packet to identify a packet flow associated with the packet, e.g., using a flow-based provisioning logic to identify an n-tuple based on information carried in the header or body of the packet (e.g., a five-tuple and an input interface). Upon identifying the packet flow, flow steering unit 45 may reference an internal flow table to determine whether the flow belongs to a new packet flow or a packet flow already recognized by router 40.

If flow steering unit 45 does not find a match in the flow table 49, which indicates that the packet belongs to a new packet flow, the flow steering unit 45 directs the packet to service cards 60 of service engines 41 for firewall services. When the packet is directed to service engines 41, one of service cards 60 applies stateful firewall services to the packet, for example. For example, the service cards 60 may extract and assemble application layer data from the packet, and a deep packet inspection (DPI) engine may perform Intrusion Detection and Prevention (IDP) analysis and/or virus scanning to filter out bad packets. As a further example, the service card 60 may perform ciphering, NAT or authentication services.

Upon receiving and processing the packet or packets of a packet flow, service cards 60 may issue a command to install a dynamic filter within the flow table, such as an exact match filter that indicates particular actions to be performed when a packet is received that matches the filter. In the case that service cards 60 determine no further firewall services need be applied to a packet flow (e.g., after determining that the packet flow is trusted or benign), service cards 60 may install a filter within flow steering unit 45 to specify that subsequent packets of this packet flow session may be processed on a straight path that bypasses service engines 41. When flow steering unit 45 receives a subsequent packet of the same packet flow, flow steering unit 45 checks the flow table 49, determines that the packet matches the new dynamic filter, and directs the packet on the appropriate path according to the dynamic filter.

Management process 78 handles the management traffic that enters through interface 64. Administrator 66 ("ADMIN") can enter commands via interface 64 (e.g., a user interface) such as configuration of router 40 and service engines 41. These commands enter through interface 64 and are handled by management process 78. According to the techniques of the disclosure, management process 78 supports a command syntax that allows administrator 66 to define firewall filter processing services to be applied by execution engine. By interacting with interface 64, various clients, such as human users and automated scripts, can perform various configuration tasks. For example, the clients may configure interface cards of the router, adjust parameters for the supported network protocols, specify the physical components within the routing device, modify the routing information maintained by the router, access software modules and other resources residing on the router, and the like. For example, interface 64 may comprise a command line interface (CLI) or other suitable interface (e.g., a web browser-based interface), for processing user or script-driven commands. Interface 64 represents software executing on control plane 72 that presents a command line interface (e.g., via a shell or Telnet session) for receiving configuration data as described herein, including firewall configuration data defining firewall filter processing services to be applied by execution engine 80. Execution engine 80 processes firewall filters, which may be received via interface 64, prior to the firewall filters being programmed to firewall policies 90 for application by service engines 41 of service cards 60.

Management process 78 may store the configuration input received from administrator 66 as configuration data 82 ("CONFIG. DATA 82"), which may take the form of a text file, such as an ASCII file, in some examples. In some examples, management process 78 may process the configuration input and generate configuration data 82 in any one of several forms, such as one or more databases, tables, data structures, or the like. Configuration data 82 may take the form of one or more commands for adding new settings to the current configuration of router 40, commands for deleting or modifying existing settings of the current configuration, or combinations thereof. Router 40 may further parse configuration data 82 and input from administrator 66, and resolve the references to appropriately configure router 40.

Administrator 66 inputs commands to interface 64 to configure firewall policies (e.g., firewall filters) for services engines 41. Management process 78 stores the firewall policies to configuration data 82. Execution engine 80 processes the firewall policies from configuration data, and provides the processed firewall filters to services process 55. Services process 55 programs firewall filters to firewall policies 90 of service plane 74 based on the configuration data 82. Service engines 41 subsequently apply firewall or other services to packets received via data plane 76, based on firewall policies 90.

Router 40 may, for example, provide a text-based command line interface by which a system administrator 66, other user, or software agent provides configuration data in conformance with a command syntax for configuring execution engine 80 and firewall policies 90. This allows the user to define desired firewall filter processing services in a simple and modular fashion. The configurable execution engine 80 allows the user to select categories of types of firewall filter processing services to be applied that suit the specific applications and/or use cases pertinent to router 40, which may lead to more scalable service treatment. In some examples, the user or administrator may be, for example, an internal applications writer, such as from the router vendor's engineering department. In some examples, the administrator may be an administrator of the router 40, which uses the filters, e.g., a customer external to the router vendor. That is, the firewall processing pipelines of execution engine 80 may be created by a different entity/administrator than the entity/administrator who configures the firewall filters that are processed by the firewall processing pipelines.

In some examples, firewall filter processing services that may be configured as part of the execution engine 80 service pipelines are classified into the following categories: validation service, optimization service, comparison service, and conversion service. In other examples, different, fewer, or more firewall filter processing services may be provided. The pipeline may correspond to a thread, in some examples. In some examples, execution engine 80 provides an execution environment for multiple different user-configured filter processing pipelines.

All of the different firewall filter processing rules are grouped by type and provided within the appropriate service. For example, validation rules are within the validation service, optimization rules are within the optimization service, comparison rules are within the comparison service, and conversion rules are within the conversion service. The user has the option to choose any of the services. Any service can be added to or removed from the execution engine 80 pipeline based on the user's requirements. If certain services are not needed by a user, the user can remove the service which can save CPU processing cycles and leave more CPU resources for existing services, thereby making the system more scalable. In addition, if in the future there is a requirement to add additional services, services can easily be added to the execution engine 80 service pipeline.

In some examples, these services used by execution engine 80 will be available in a library, which may be stored on router 40 or maintained in a different, physically separate network device other than router 40. The administrator selects the service for execution engine 80 based on the requirements of the use cases, and programs execution engine 80, e.g., via interface 64 and management process 78. Execution engine 80 may call the APIs of the service. The services may be implemented as service modules within the library, and execution engine 80 may make calls using library APIs to access the particular service modules. As execution engine 80 is running in control plane 72 of router 40, execution engine 80 has information about what platform router 40 is running, so a service within execution engine 80 can reject a proposed firewall rule if the firewall rule does not work for the underlying platform. For example, execution engine compares the firewall filter or rule to platform policies to determine whether the firewall rule is allowed for the platform of router 40. If any stage fails in the firewall processing pipeline of execution engine 80 fails, the firewall rule will not be published. In addition, execution engine 80 may output a notification to the user configuring the firewall filters to notify that processing of the firewall filter or rule has failed. For example, prior to programming a received firewall filter to hardware of the network device for filtering network traffic, the execution engine pipeline processes the firewall filter, and may output, in response to processing the received firewall filter, a notification indicating that processing of the received firewall filter has failed. In this case, the network device refrains from programming the received firewall filter to the hardware of the network device.

In this manner, the techniques of this disclosure may avoid publishing and/or programming of incorrect firewall rules, thereby making the firewall rule configuration more efficient. This process may also help train the user to update, improper firewall filters and propose acceptable alternatives that will be successfully processed.

Validation service operates to validate the filter match condition and corresponding action. For example, the validation service can detect when the firewall rule writer has configured a firewall rule with an action that cannot go with the match condition. As another example, the validation service can determine whether values specified for the match conditions are out of range. The validation service also checks unsupported match conditions, actions and with respect to the respective hardware platforms. The validation service determines whether the rules are valid for the hardware platform (e.g., ASIC chipset). For example, different hardware platforms may have different hardware capabilities, and some firewall rules may not be supported by some hardware platforms. The validation service may make the above determinations by checking the firewall rules against configured policies, rules, or other stored information, which may change and be dynamically updated as new releases occur.

Optimization service operates to increase CPU performance and consume fewer hardware resources. Optimization may operate at the terms level, within a single firewall rule. For example, optimization service may eliminate redundant terms, remove terms which are never hit, or terms which will always be hit regardless of incoming traffic. The optimization service may compile or consolidate firewall filter terms. In this manner, the optimization service operates to represent the firewall rule in a more compact format that provides the same results, but requires fewer memory entries and fewer CPU cycles to run. Thus, when the firewall rule is eventually programmed to device hardware (e.g., to service cards or line cards), fewer computing resources are required to program and use the firewall rule, and the firewall functionality can be provided more rapidly and in a scalable way.

Comparison service operates such that when the filter is modified, the comparison service identifies modified terms, match conditions and actions. That is, the comparison service compares a new firewall filter to what has already been programmed, and publishes only the changed part. This may help conserve bandwidth between the control plane 72 and service plane 74 and/or data plane 76 of router 40, and may conserve hardware resources such as memory and CPU processing.

Conversion service provides service to convert firewall filters to suit to certain hardware platforms. Prior to being received by the conversion service within the processing pipeline of execution engine 80, the firewall filter may be represented in an internal, normalized format. The conversion service processes a firewall filter from the internal representation of the filter to a specific format that is usable by router 40. That is, after the conversion service processes the firewall filter, execution engine 80 outputs a processed firewall filter that services process 55 provides to service plane 74 for storage in firewall policies 90 for use by service engines 41. The conversion service operates such that the processed firewall filter is provided to the service plane 74 and/or data plane 76 in a format that is suited to the underlying hardware platform of router 40. The resulting processed firewall filters are intelligently tailored for their specific hardware platform. In this manner, the conversion service avoids line cards being programmed with firewall rules that are not correct for the line card hardware platform, potentially conserving hardware resources such as memory and CPU processing.

The output of execution engine 80 is processed firewall rules, for any firewall rules that did not experience a processing failure. In some examples, the processed firewall rules can be published by control plane 72 and consumed by consumers of the published firewall rules. Consumers of the processed firewall rules may, for example, be processes executing on line cards, such as service cards 60 (e.g., line card daemons). The consumers can then program their hardware based on the published firewall rules. For example, service engines 41 may be consumers of the processed (and, e.g., published) firewall rules, and may program service cards 60 with the processed firewall rules. For example, service cards may have firewall policies 90 programmed thereon. In some examples, router 40 may be implemented having a distributed operating system, as described in further detail below with respect to FIG. 4. In some examples, router 40 may be a multi-chassis router, as described in FIG. 5.

Router 40 may further include a physical chassis (not shown) for housing control plane 72, service plane 74, and data plane 76. Data plane 76 may also be referred to as a forwarding plane. The chassis has a number of slots (not shown) for receiving a set of cards, including IFCs 54 and service cards 60. Each card may be inserted into a corresponding slot of the chassis for electrically coupling the card to components of router 40, e.g., a control unit, via a bus, backplane, or other electrical communication mechanism.

Router 40 may operate according to executable instructions stored on a computer-readable storage medium (not illustrated). Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of router 40. Router 40, in some examples, retrieves and executes the instructions from memory for these aspects.

Figure 3A:
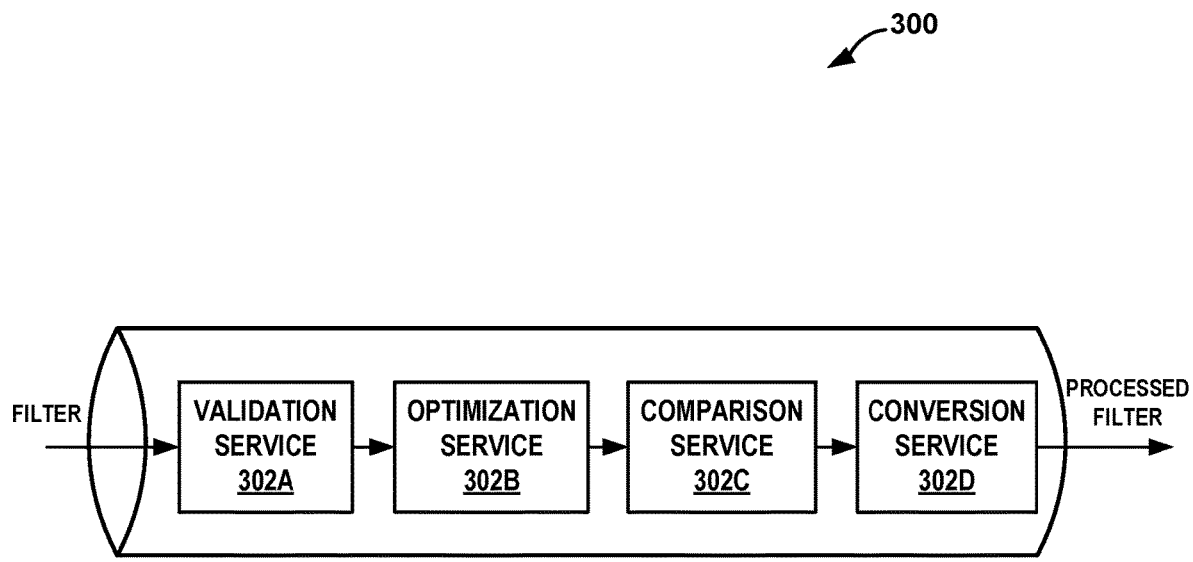
FIGS. 3A-3C are block diagrams illustrating example execution engine service pipelines, in accordance with aspects of the techniques of this disclosure.
Figure 3B:
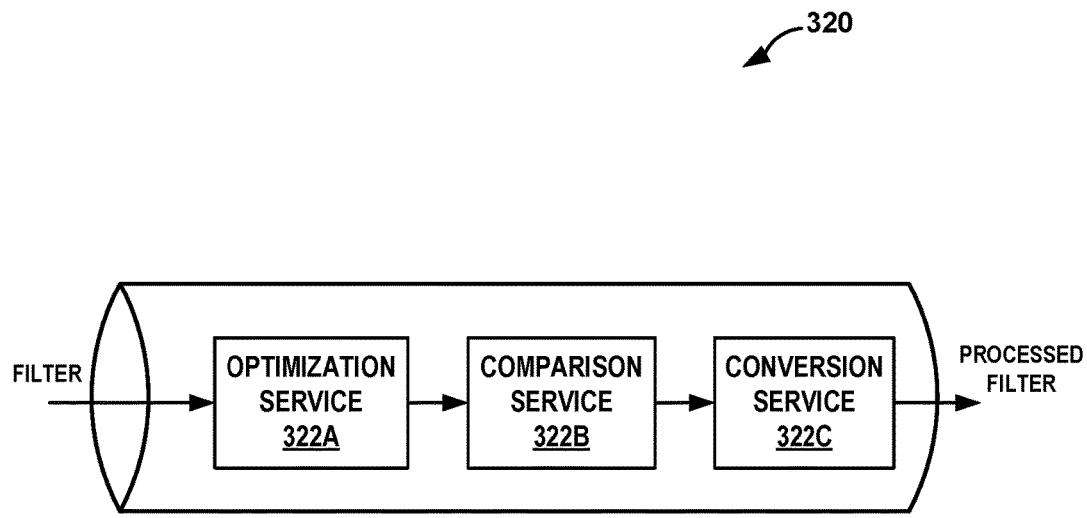
Figure 3C:
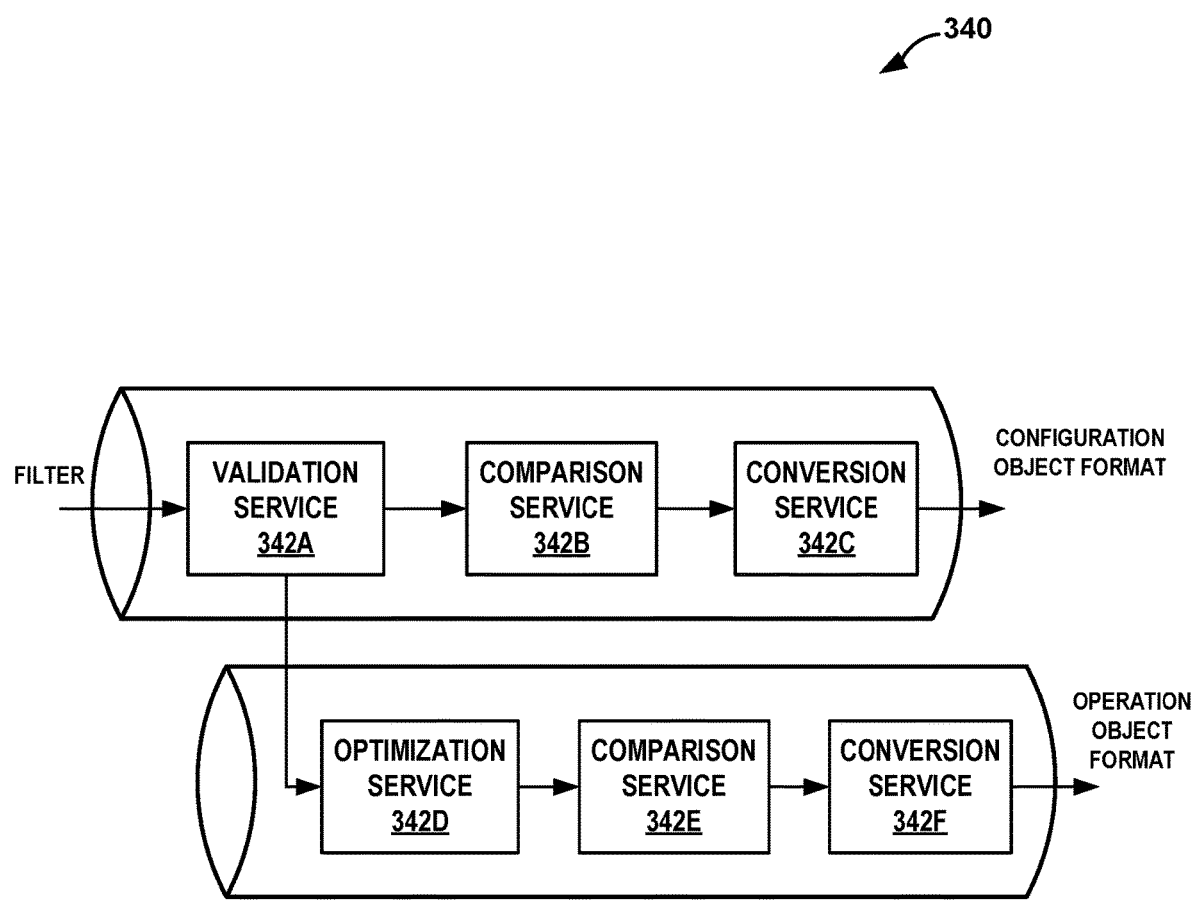

FIGS. 3A-3C are block diagrams illustrating example execution engine service pipelines, in accordance with aspects of the techniques of this disclosure. Execution engines 300, 320, and 330 illustrate example configurations that may be applied to execution engine 80 of FIG. 2, as configured via management process 78, such as based on input via interface 64. A firewall filter is input to execution engines 300, 320, 340, such as a firewall filter received by interface 64. A processed firewall filter is output by execution engines 300, 320, 340, such as to services process 55 for programming to firewall policies 90, or to a distributed operating system publication function for publishing to consumers of the processed firewall filters, such as line cards in a line card chassis of multi-chassis router.

FIG. 3A illustrates an execution engine 300 having a firewall filter processing pipeline consisting of a validation service 302A, followed by an optimization service 302B, followed by a comparison service 302C, followed by a conversion service 302D.

FIG. 3B illustrates an execution engine 320 having a firewall filter processing pipeline consisting of an optimization service 322A, followed by a comparison service 322C, followed by a conversion service 322D. Execution engine 320 may be used in a situation where some applications already provide a validation function, in which case the validation service can be omitted in the execution engine. This avoids unnecessary services being applied, and conserves computing resources for those services which are to be applied.

FIG. 3C illustrates an execution engine 340 having a firewall filter processing pipeline. The user can define the pipeline to include a chain of services for a filter processing pipeline that can fork into multiple services. Execution engine 340 includes a validation service 342A that, depending on the one or more factors, causes the pipeline to split to either be followed by a comparison service 342B, followed by a conversion service 342C, which outputs the firewall filter in a configuration object format, or to be followed by an optimization service 342D, followed by a comparison service 342E, followed by a conversion service 342F, which outputs the firewall filter in an operation object format. In one example, a firewall filter may progress down one or another branch of the pipeline (or both) depending on whether the firewall filter is configured through a CLI interface (prompt) such as interface 64 or through some other application. If the filter is configured through some other application, the filter can take an additional path to produce the "configuration object format" apart from producing "operation object format". This is not required for CLI-configured filters, since the configuration is already managed/stored by CLI infrastructure (e.g., in configuration data 82).

Configuration object format is the representation of the filter as configured by the user (no optimization). This is to provide consistent view to the user. The user will always be presented with this format/state if the user queries for the filter the user has configured. The user can later specify further modifications to the filter based on this representation. Operation object format is the format/shape a filter takes after the filter undergoes various stages of processing/optimization in the pipeline. This format may be different than the configuration object format (though it fully serves the user's intent). The operation object format is what is used by other components (such as PFE) to program the hardware. The operation object format may be suitable for different hardware platforms.

Other variations on forked firewall processing pipelines may be configured using the execution engine platform. In this manner, the execution engine can be defined by user input to include forked services such that the execution engine pipeline includes multiple sub-paths, depending on various factors.

In some examples, each service of the firewall filter processing services can be sub-services provided within a sub-module of a centralized library. A centralized library may be easy to maintain. The sub-modules provide firewall filter processing rules for each sub-service. Providing the firewall filter processing rules as a service or a sub-service makes the system highly scalable, as well. For example, having the services on a central library makes it easy to detect and propagate any code changes. Code changes need only be made in a single, centralized place. When services are created or modified, unit tests may be performed on host personal computer or virtual machines, without requiring running the tests on the router.

Figure 4:
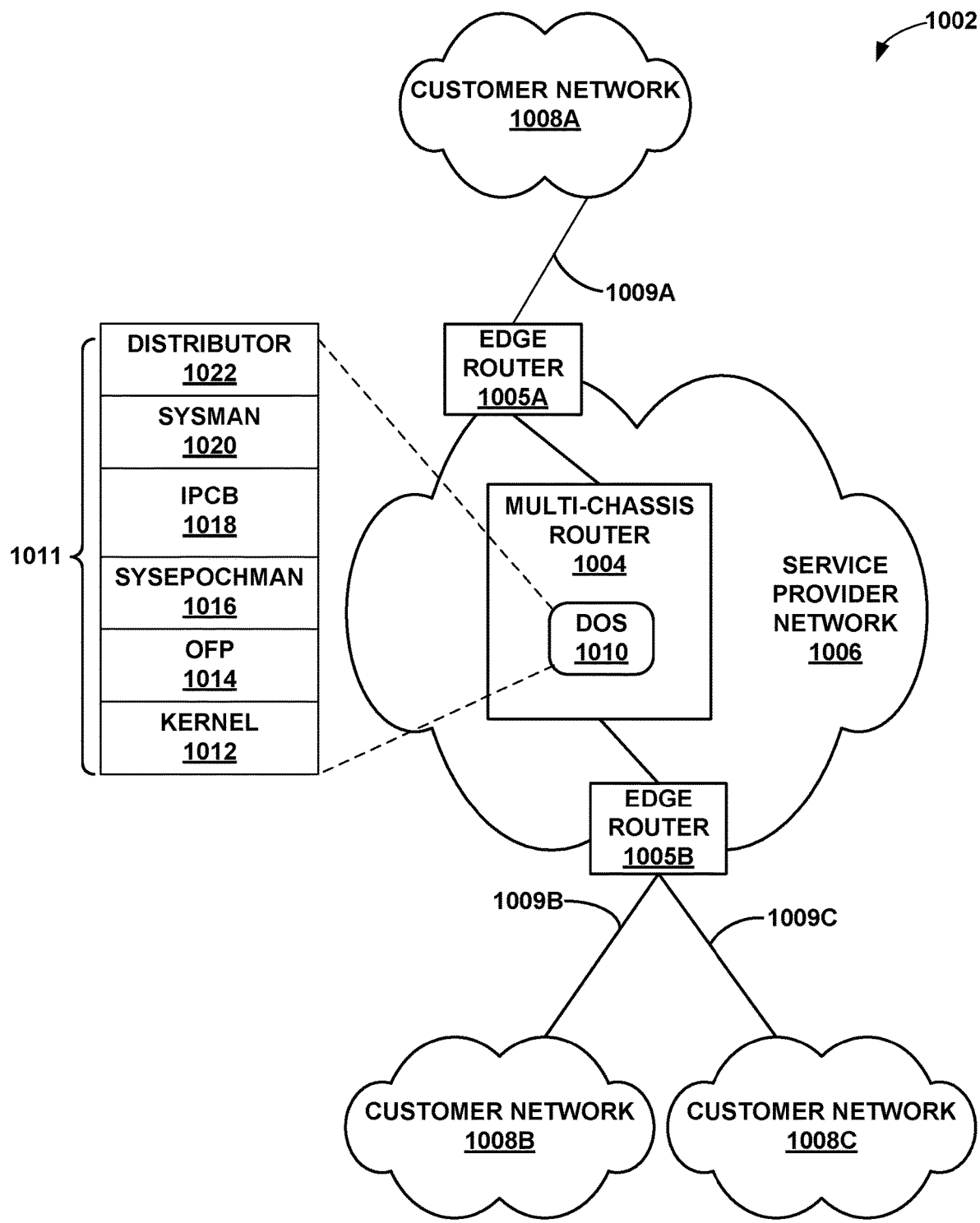
FIG. 4 is block diagram of an example network computing environment in which a service-provider network includes a multi-chassis router configured to operate in accordance with distributed operating system techniques as described in this disclosure.

FIG. 4 is a block diagram illustrating an example computing environment 1002 in which service provider network 1006 includes a multi-chassis router 1004. Multi-chassis router 1004 may operate as described above with respect to router 40. In this example, multi-chassis router 1004 communicates with edge routers 1005A and 1005B ("edge routers 1005") to provide customer networks 1008A-1008C ("customer networks 1008") with access to network 1006. In one example, multi-chassis router 1004 includes a central switch card chassis (SCC) that operates as a control node and one or more line card chassis (LCCs) that operate as packet routing devices. The LCCs may contain all the physical interfaces for coupling to other devices within network 1006, while the SCC controls and routes traffic between the LCCs.

Although not illustrated, service provider network 1006 may be coupled to one or more networks administered by other providers, and may thus form part of a large-scale public network infrastructure, e.g., the Internet. Consequently, customer networks 1008 may be viewed as edge networks of the Internet. Service provider network 1006 may provide computing devices within customer networks 1008 with access to the Internet, and may allow the computing devices within customer networks 1008 to communicate with each other. Service provider network 1006 may include a variety of network devices other than multi-chassis router 1004 and edge routers 1005, such as additional routers, switches, servers, or other devices.

In the illustrated example, edge router 1005A is coupled to customer network 1008A via access link 1009A and edge router 1005B is coupled to customer networks 1008B and 1008C via access links 1009B and 1009C, respectively. Customer networks 1008 may be networks for geographically separated sites of an enterprise. Customer networks 1008 may include one or more computing devices (not shown), such as personal computers, laptop computers, handheld computers, cellular phones (including so-called "smart phones"), tablet computers, workstations, servers, switches, printers, or other devices. The configuration of computing environment 1002 illustrated in FIG. 4 is one example. For example, service provider network 1006 may be coupled to any number of customer networks 1008.

Nonetheless, for ease of description, only customer networks 1008A-1008C are illustrated in FIG. 4.

Multi-chassis router 1004 may provide for failover by including a primary routing engine as well as one or more standby routing engines. For example, an SCC may contain primary and standby master routing engines, and one or more LCCs may contain primary and standby local routing engines. Primary master routing engine may propagate state information to the standby master engine prior to forwarding the state information to the primary local routing engines in the LCCs. Similarly, the primary local routing engines propagate the state information to one or more standby local routing engines prior to forwarding the state information to consumer components (which may be referred to as "consumers") within their chassis. In this manner, multi-chassis router 1004 enforces a synchronization gradient when communicating state information throughout the multi-chassis environment.

In the event a primary routing engine fails, a standby routing engine in the same chassis assumes control over routing resources and routing functionality for that chassis. Moreover, because state information is propagated to a standby routing engine prior to forwarding the state information to a consumer, a standby routing engine can take up forwarding state information to consumers at the same place where the primary routing engine left off. U.S. Pat. No. 7,739,403 titled "Synchronizing State Information Between Control Units", filed Oct. 3, 2003, describes techniques for a synchronization gradient within a standalone router and is hereby incorporated by reference. U.S. Pat. No. 7,518,986 titled "Push-Based Heirarchical State Propagation within a Multi-Chassis Network Device," filed Nov. 16, 2005, describes techniques for a push-based state synchronization within multi-chassis routers and is hereby incorporated by reference. In this manner, the primary and standby routing engines synchronize their respective state information to allow the standby routing engine to assume control of the router resources without having to relearn state information.

In some examples, multi-chassis router 1004 may be configured to execute a single instance of an operating system 1010 across all computing nodes (which may collectively refer to all producers and consumers) of multi-chassis router 1004. The operating system described in this disclosure may be referred to as a distributed operating system 1010 ("DOS 1010") in that execution is distributed across all computing nodes. Each of the computing nodes may self-organize, coalescing so as to execute the single instance of distributed operating system 1010. The computing nodes may include hardware computing nodes (such as routing engines, hardware forwarding units, which may include application specific integrated circuits, and interface cards) and virtual computing nodes executed by hardware control units (e.g., one or more processors, one or more application specific integrated circuits, field-programmable gate arrays, etc.).

The computing nodes may execute a distributed application suite within the execution environment provided by the distributed operating system. Applications, in the context of multi-chassis router 1004, may include network protocols, such as routing protocols, management protocols, management interfaces (graphical user interfaces (GUIs), command line interfaces (CLIs), etc.), communication protocols, firewall application, and the like.

Distributed operating system 1010 may distribute application state among the computing nodes supporting execution of distributed operating system 1010 based on computing node capability and/or role within multi-chassis router 1004. Distributed operating system 1010 may manage propagation of state information in support of the execution of distributed operating system 1010 and/or the applications executing within the execution environment provided by distributed operating system 1010. For example, distributed operating system 1010 may distribute state for a firewall application in accordance with the techniques of this disclosure. For example, distributed operating system 1010 may distribute state relating to execution engine filter processing pipeline and/or processed firewall filters, or other state information relating to a firewall application.

Distributed operating system 1010 may utilize a hierarchical naming scheme for propagating state information from producers to consumers. Rather than push all state information produced by every producer to each and every consumer, multi-chassis router 1004 may establish the hierarchical naming scheme so as to associate objects (which may refer to a discrete portion of state information) with a scope of distribution, which results in distribution of the objects only to those consumers that have requested the particular object. Using the hierarchical naming scheme, a consumer within multi-chassis router 1004 may request any scope of state information up to and including all of the state information produced by any producer within multi-chassis router 1004, and down to an individual object. More information regarding the hierarchical naming scheme and how the hierarchical naming scheme may more efficiently propagate state information using an object flooding protocol (OFP) can be found in U.S. application Ser. No. 15/198,912, entitled "HIERARCHICAL NAMING SCHEME FOR STATE PROPAGATION WITHIN NETWORK DEVICES," filed Jun. 30, 2016, the entire contents of which are hereby incorporated by reference as if set forth in its entirety.

In operation, each of the computing nodes of multi-chassis router 1004 may first execute the same infrastructure to support execution of distributed operating system 1010. For example, each of the computing nodes of multi-chassis router 1004 may execute a kernel 1012, such as a Linux® kernel. Execution of each instance of kernel 1012 is considered "separate" at this point only because the computing nodes have not yet coalesced to support execution of distributed operating system 1010. After self-organizing (or, in other words, coalescing), the computing nodes may execute a single distributed kernel 1012 to the extent that kernel 1012 is aware of applications and/or other processes executed by other computing nodes. Executing a uniform kernel 1012 across all of the computing nodes may improve reliability in that kernel 1012 may only rarely be updated, allowing for upgrades further up software stack 1011 to occur without reboots (as the kernel may not change between upgrade releases). Separating kernel 1012 from other aspects of distributed operating system 1010 may also decouple the update cycle for kernel 1012 from that of other processes or features of distributed operating system 1010.

After executing the separate instances of kernel 1012, each computing node may next execute OFP 1014. OFP 1014, as noted above, may propagate the state information between the computing nodes of distributed operating system 1010. As noted above, OFP 1014 may provide a subscription model for state information propagation, thereby allowing for potentially more efficient propagation of state information compared to a push-model of state information propagation. OFP 1014 may allow for a multicast type of state information propagation that may reliably deliver state information to multiple computing nodes of distributed operating system 1010 concurrently.

OFP 1014 may also allow for self-assembly, where OFP 1014 provides a mechanism by which to discover computing nodes available to participate in execution of distributed operating system 1010, and the link interconnecting the computing nodes. OFP 1014 may generate a graph data structure representative of a topology of the computing nodes and links, with edges of the graph data structure representing the links interconnecting computing nodes, and the graph nodes of the graph data structure representing the computing nodes available to support execution of distributed operating system 1010. The graph nodes are referred to as graph nodes to distinguish from the nodes of the graph data structure from the computing nodes supporting execution of distributed operating system 1010. Reference to "nodes" in this disclosure is intended to refer to the nodes supporting execution of distributed operating system 1010 and not the graph nodes of the graph data structure unless explicitly noted elsewhere or clearly implied by context. OFP 1014 may also provide node reachability services to determine liveliness of nodes.

After initializing OFP 1014, each of the computing nodes of multi-chassis router 1004 may next execute a system epoch management (SysEpochMan) process 1016. SysEpochMan process 1016 may organize the (up to this point, distinct and separate) computing nodes to support execution of single distributed operating system 1010. SysEpochMan process 1016 may also monitor distributed operating system 1010 to ensure integrity in case one or more computing nodes fail. SysEpochMan process 1016 may provide for transitions from the previous system state to the new system state in the event of, changes to the number of computing nodes, interruption in inter-node connection, the organization of the computing nodes, and/or changes in computing node roles.

SysEpochMan process 1016 may establish (and maintain) a Zookeeper® plane (where Zookeeper® refers to the Apache Zookeeper® project) and the OFP domain (which may refer to an OFP domain for use by distributed operating system 1010 to propagate state information particular to distributed operating system 1010 and not related to applications). While described with respect to Zookeeper®, the techniques of this disclosure may be performed with respect to any inter-process communication bus or mechanism. As such, Zookeeper® is referred to throughout this disclosure more generally as an inter-process communication bus 1018 ("IPCB 1018").

IPCB 1018 may differ from OFP 1014 in that OFP 1014 is an asynchronous communication protocol (meaning that OFP may guarantee eventual object delivery without ensuring ordered delivery of the objects) while IPCB 1018 is a synchronous communication protocol (meaning that IPCB 1018 may ensure delivery with proper ordering of changes, or in other words, all computing nodes receive the changes in the order the changes occur). IPCB 1018 may execute within the SysEpochMan process 1016 to coordinate services such as leader election (within the computing nodes) and namespace allocation.

After forming IPCB 1018 (and assuming OFP 1014 is operational), the computing nodes of multi-chassis router 1004 may effectively communicate with one another to coalesce and execute distributed operating system 1010. The computing nodes may next execute a system manager ("SysMan") process 1020 that coordinates the execution of applications within the execution environment provided by the distributed operating system. Each of SysMan processes 1020 may elect a SysMan master instance (e.g., using IPCB 1018), which may be responsible for execution of applications on particular computing nodes according to, as one example, a policy engine.

The SysMan master process may communicate (e.g., via IPCB 1018) the application decisions to the local SysMan processes that then act on the application decisions to execute the applications. The local SysMan processes monitor the executing of the applications and provide a status of the application to the SysMan master process to allow the SysMan master process to monitor the status of the applications. When the status indicates that an application has failed, the SysMan master process may, to provide a few examples, reinitiate execution of the application (by the same or a different computing node) or activate a standby instance of the application.

The computing nodes of multi-chassis router 1004 may also execute a distributor process 1022 as part of distributed operating system 1010. Distributor process 1022 (which may also be referred to as the "distributor 1022") may form an object daemon data store (DDS) and coordinate with individual applications for delivery of state information. Distributor 1022 may operate as a client to OFP 1014, and deliver objects between distributors executed by the different computing nodes.

As noted above, distributed operating system 1010 executes to provide an execution environment in which the applications may operate. From the perspective of the distributed operating system, the computing nodes are all uniform and only distinguishable by which applications each computing node executes. Applications may refer to any process that is not described above with respect to distributed operating system 1010, including Linux daemons, firewall applications, and PFE applications (or, in other words, software) other than low level drivers and/or firmware. For example, distributed operating system 1010 provides an execution environment for a firewall application that operates in accordance with the techniques of this disclosure, such as described with respect to firewall 6, and which may include aspects of execution engine 80 and other components of FIG. 2, as described herein.

SysMan 1020 may distribute applications across multiple computing nodes, using objects to communicate the state information associated with these types of distributed applications. For example, multi-chassis router 1004 may execute an application including the routing protocol process and a collection of one or more PFE route handlers.

SysMan process 1020 does not bind applications to particular hardware, thereby allowing application mobility (which may also be referred to as "process mobility"). SysMan process 1020 may transfer applications between processing units or other hardware within a given computing node or between computing nodes to provide for failure recover, load balancing, and/or in-service system updates (ISSU).

Upon successfully launching distributed operating system 1010, distributed operating system 1010 may present another OFP domain for use by the applications in propagating state information from producers to consumers. For example, the computing nodes of multi-chassis router 1004 may synchronize state information for distributed operating system 1010, the applications, or other elements of multi-chassis router 1004. In particular, each of the computing nodes may instantiate a respective data structure that stores a plurality of objects, where each of the objects defines at least a portion of the state information, e.g., for distributed operating system 1010 and/or for one or more of the applications. The computing nodes may synchronize the respective data structures according to the OFP domain, by executing OFP 1014. Furthermore, the computing nodes may use the synchronized data structures for configuration, e.g., of themselves and/or other components of the computing nodes.

For example, the computing nodes executing various instances of distributed operating system 1010 may instantiate one or more topics arranged in a hierarchical manner. Other nodes, applications, or components of nodes may act as consumers of these topics. The consumers may, once these topics are instantiated, receive updates to a local topic database informing the consumer of the new topics. The consumers may then subscribe to the new topic such that the objects published to the topic are distributed only to the subscribing consumers. The consumers may then consume the objects to update local state information without having to filter or otherwise discard objects that are not relevant to the operation of the consumer.

In this manner, multi-chassis router 1004 may include a plurality of hardware computing nodes configured to execute a distributed operating system, at least one of the plurality of hardware computing nodes configured to receive data defining a plurality of firewall filter processing services, the data defining an order in which to apply services of the plurality of firewall filter processing services to firewall filters, and configure, based on the received data, an execution engine pipeline to include the plurality of firewall filter processing services in the defined order. Prior to programming a received firewall filter to hardware of the network device for filtering the network traffic, multi-chassis router 1004 may process the firewall filter by the execution engine pipeline to produce a processed firewall filter, and program the processed firewall filter to the hardware for filtering the network traffic. In some examples, a firewall application may be used. In this way, the services of the execution engine's pipeline are applied to firewall filters.

Figure 5:
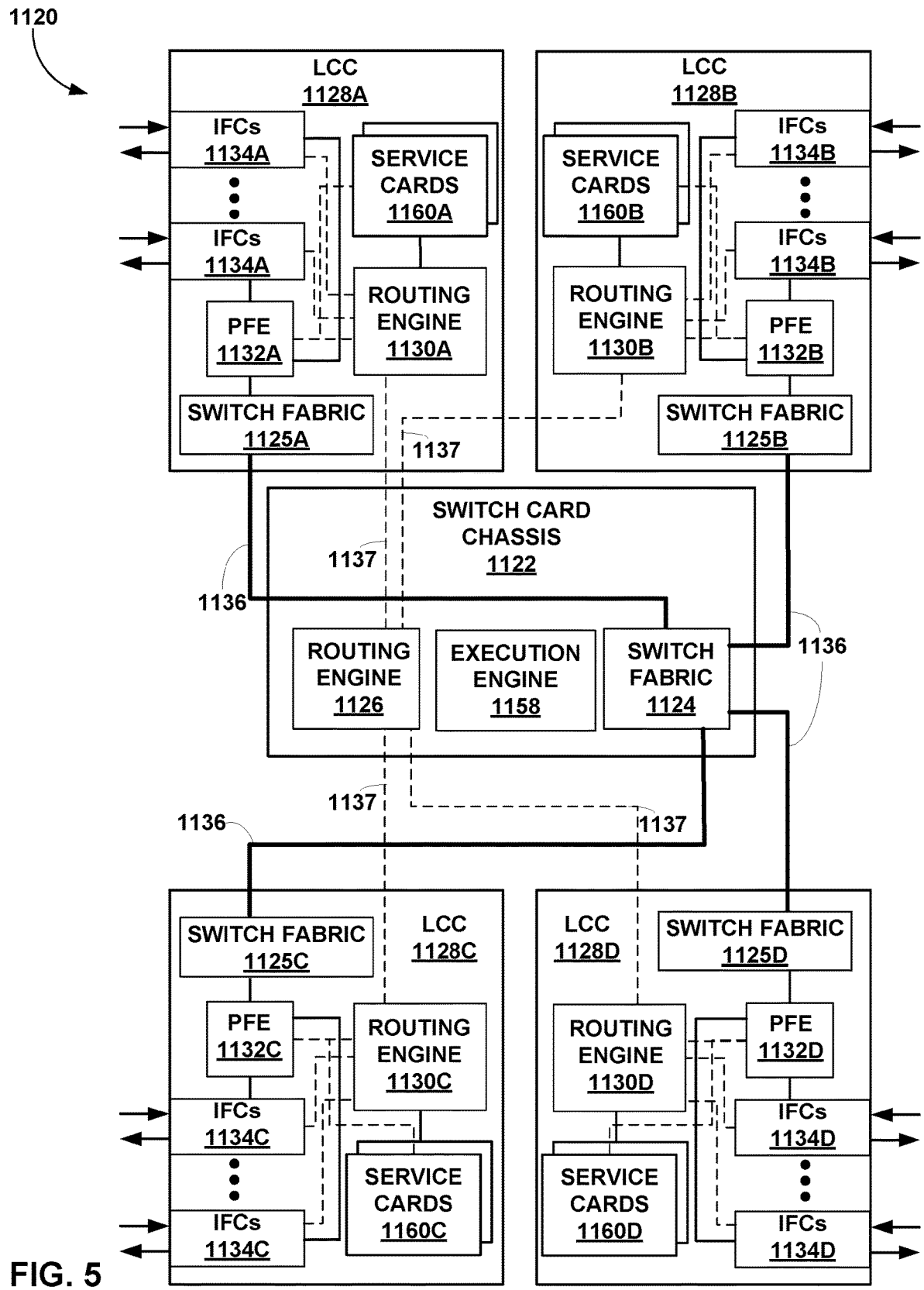
FIG. 5 is a block diagram illustrating an example multi-chassis router configured to operate in accordance with the distributed operating system techniques described in this disclosure.

FIG. 5 is a block diagram illustrating an example multi-chassis router 1120 configured to operate in accordance with the techniques described in this disclosure. Multi-chassis router 1120 routes data packets between network devices across a network. Multi-chassis router 1120 may be an example instance of any of router 4 of FIG. 1, router 40 of FIG. 2, and multi-chassis router 1004 of FIG. 4. In this example, multi-chassis router 1120 comprises four substantially identical LCCs 1128A-1128D ("LCCs 1128") and SCC 1122 that operates as a central control node. In other examples, a multi-chassis router may include more or less LCCs. SCC 1122 provides centralized switching and control for multi-chassis router 1120. LCCs 1128 provide interfaces to a network using IFC sets 1134A-1134D ("IFCs 1134").

SCC 1122 includes switch fabric 1124, a master routing engine 1126, and execution engine 1158. Execution engine 1158 may operate in a manner similar to that described with respect to execution engine 80 of FIG. 2, for example. Although not shown in the example of FIG. 5, SCC 1122 may include a standby master routing engine when multi-chassis router 1120 is configured as a high-availability router.

Switch fabric 1124 provides a back-side connection, i.e. a connection separate from the network, between switch fabric 1125 of LCCs 1128. Functions of master routing engine 1126 include maintaining routing information to describe a topology of a network, and using that information to derive forwarding information bases (FIBs). Routing engine 1126 controls packet forwarding throughout multi-chassis router 1120 by installing the FIB in LCCs 1128 via communication with local routing engines 1130 over cables 1137. A FIB for one of LCCs 1128 may be the same or different than a FIB for other LCCs 1128 and SCC 1122. Because cables 1137 provide a dedicated connection, i.e., separate from a data packet forwarding connection provided by cables 1136, between SCC 1122 and LCCs 1128, FIBs in LCC routing engines 1130 can be updated without interrupting packet forwarding performance of multi-chassis router 1120.

LCCs 1128 each contain one of local routing engines 1130A-1130D ("routing engines 1130"), one of switch fabrics 1125A-1125D ("switch fabric 1125"), at least one packet forwarding engine (PFE), shown as PFEs 1132A-1132D ("PFEs 1132"), one or more service cards, shown as service cards 1160A-1160D ("service cards 1160), and one or more IFCs 1134. In some examples when multi-chassis router 1120 is configured to provide high-availability, LCCs 1128 may also include one of standby local routing engines in addition to one of local routing engines 1130, which may be referred to as primary local routing engines 1130 in the high-availability configuration.

Multi-chassis router 1120 performs routing functions in the following manner, as an example. An incoming data packet is first received from a network by one of IFCs 1134, e.g., 1134B, which directs it to one of PFEs 1132, e.g., PFE 1132B. The PFE then determines a proper route for the data packet using the FIB provided by the primary local routing engine, e.g., routing engine 1130B. If the data packet is destined for an outbound link associated with the one of IFCs 1134 that initially receive the packet, the PFE forwards the packet to the outbound link. In this manner, packets sent out by the same PFE on which they were received from the network bypass switch fabric 1124 and switch fabric 1125.

Otherwise, the PFE sends the data packet to switch fabric 1125, where it is directed to switch fabric 1124 and follows a route to one of the other PFEs 1132, e.g., PFE 1132D. This PFE, e.g., PFE 1132D, sends the data packet across the network via one of IFCs 1134, e.g., IFC 1134D. Thus, an incoming data packet received by one of LCCs 1128 may be sent by another one of LCCs 1128 to its destination. Other multi-chassis routers that operate in a manner consistent with the techniques described in this disclosure may use different switching and routing mechanisms.

Local routing engines 1130 control and manage LCCs 1128 but are subservient to master routing engine 1126 of SCC 1122. For example, after receiving state information updates from master routing engine 1126, local routing engines 1130 forward the state information update to consumers on LCCs 1128 using the hierarchically-ordered and temporally-linked data structure. For example, consumers that receive state information updates from local routing engines 1130 include service cards 1160, PFEs 1132, and IFCs 1134. Local routing engines 1130 also distribute the FIB derived by primary master routing engine 1126 to PFEs 1132.

Routing engines 1126 and 1130 may operate according to executable instructions fetched from one or more computer-readable media. Examples of such media include random access memory (RAM), read-only memory (ROM), non-volatile random-access memory (NVRAM), electrically erasable programmable read-only memory (EEPROM), flash memory, and the like. The functions of multi-chassis router 1120 may be implemented by executing the instructions of the computer-readable medium with one or more processors, processing circuitry, discrete hardware circuitry, firmware, software executing on a programmable processor, or combinations thereof.

As described above, nodes may include routing engine 1126, routing engines 1130, PFEs 1132, and IFCs 1134. Links may include switch fabric 1124 and cables 1136 and 1137, as well as other cables shown but not enumerated for ease of illustration purposes. The various nodes may perform aspects of the techniques described herein with respect to a single node of multi-chassis router 1120. For example, various nodes may perform aspects of the techniques described herein with respect to router 40 of FIG. 2. In some examples, execution engine 1158 may process firewall filters as described with respect to execution engine 80, and output processed firewall filters. In some examples, routing engine 1126 of switch card chassis 1122 may publish the processed firewall filters, which may be consumed by components of LCCs 1128, such as by routing engines 1130 and/or service cards 1160 of LCCs 1128. Service cards 1160 may operate as described with respect to service cards 60 of FIG. 2. In some examples, routing engines 1130 may program service cards 1160 with the processed firewall filters. In some examples, different ones of LCCs 1128 may conform to different hardware platforms, and execution engine 1158, for a single received firewall filter input, may output multiple processed firewall filters as different objects in formats tailored for consumption by the different LCC 1128 hardware platforms.

Figure 6:
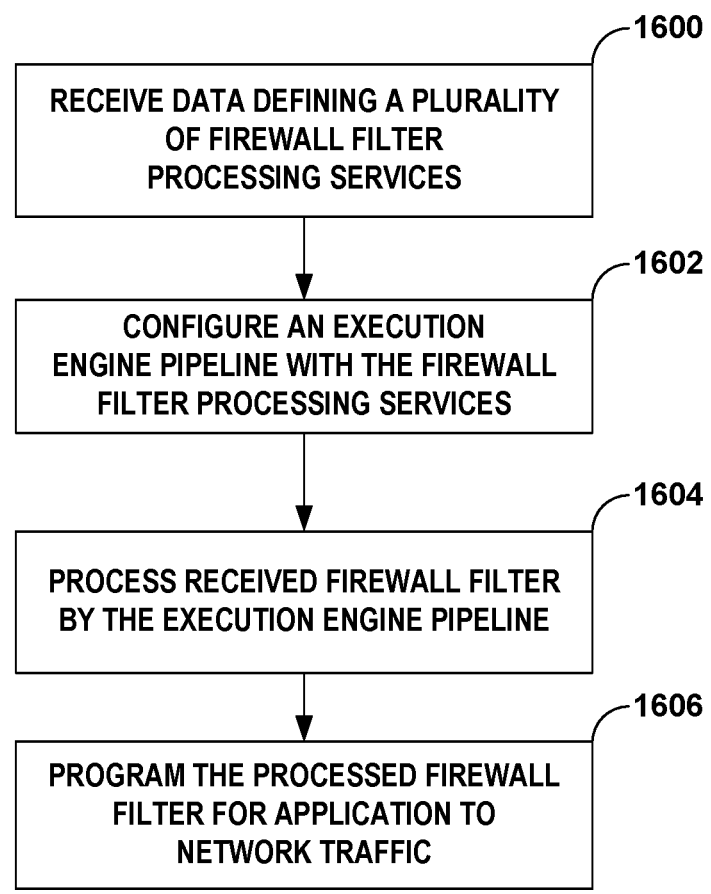
FIG. 6 is a flowchart illustrating example operation of one or more network devices in accordance with the techniques of the disclosure.

FIG. 6 is a flowchart illustrating example operation of one or more network devices in accordance with the techniques of the disclosure. FIG. 6 may illustrate example operation of any of router 4, router 40, multi-chassis router 1004, and multi-chassis router 1120, for example.

The network device receives data defining a plurality of firewall filter processing services, the data defining an order in which to apply services of the plurality of firewall filter processing services to firewall filters (1600). For example, the data defining the plurality of firewall filter processing services may include data defining a validation service as a first stage of the execution engine pipeline, wherein the validation service validates a match condition and corresponding action. As another example, the data defining the plurality of firewall filter processing services may include data defining an optimization service as a stage of the execution engine pipeline, wherein the optimization service eliminates redundant firewall filter terms, removes firewall filter terms following terms that will always be satisfied, and removes firewall filter terms that will never be satisfied. As another example, the data defining the plurality of firewall filter processing services may include data defining a comparison service as a stage of the execution engine pipeline, wherein the comparison service identifies modified terms, match conditions, and actions of a firewall filter that have been modified relative to firewall filters already programmed to the hardware, and passes only the modified terms, match conditions, and actions along for further processing of the execution engine pipeline and for subsequent programming to the hardware. As another example, the data defining the plurality of firewall filter processing services may include data defining a conversion service as a final stage of the execution engine pipeline, wherein the conversion service converts the firewall filter to an object format suitable for programming to the hardware of the network device.

The network device configures, based on the received data, an execution engine pipeline (e.g., execution engine 80) to include the plurality of firewall filter processing services in the defined order (1602). Prior to programming a received firewall filter, e.g., to hardware of the network device for filtering network traffic, the network device processes the firewall filter by the execution engine pipeline to produce a processed firewall filter (1604). Subsequent to processing the firewall filter by the execution engine, the network device programs the processed firewall filter for filtering network traffic (1606). In some examples, the network device programs the processed firewall filter to hardware such as hardware of a line card, such as a service card (e.g., service cards 60, 1160). In other example, the network device programs the processed firewall filter as a software object for filtering network traffic.

One or more of the techniques described herein may be partially or wholly executed in software. For example, a computer-readable medium may store or otherwise comprise computer-readable instruction, i.e., program code that can be executed by a processor to carry out one or more of the techniques described above. For example, the computer-readable medium may comprise random access memory (RAM), read-only memory (ROM), non-volatile random access memory (NVRAM), electrically erasable programmable read-only memory (EEPROM), flash memory, magnetic or optical media, or the like.

Various examples have been described. Although described in reference to a multi-chassis router, which each chassis including a plurality of routing engines, the techniques may be applied to any multi-chassis device having a plurality of control nodes in at least one chassis. Examples of other devices include switches, gateways, intelligent hubs, firewalls, workstations, file servers, database servers, and computing devices generally. Furthermore, the described examples refer to hierarchically-ordered and temporally-linked data structures, but other examples may use different data structures.

What is claimed is:

1. A method comprising:
receiving, by a network device, data defining a plurality of firewall filter processing services, the data defining an order in which to apply, to a given firewall filter, each firewall filter processing service of the plurality of firewall filter processing services;
configuring, by the network device and based on the received data, an execution engine pipeline to include the plurality of firewall filter processing services in the defined order;
prior to programming a received firewall filter to hardware of the network device for filtering network traffic, processing the received firewall filter by the execution engine pipeline by applying, to the received firewall filter, each of the plurality of firewall filter processing services in the defined order to produce a processed firewall filter; and
programming, by the network device, the processed firewall filter to the hardware for filtering the network traffic.

2. The method of claim 1, further comprising:
applying, by the network device, the processed firewall filter to network traffic received by the network device.

3. The method of claim 1, wherein receiving the data defining the plurality of firewall filter processing services comprises receiving data defining a validation service as a first stage of the execution engine pipeline, wherein the validation service validates a match condition and corresponding action.

4. The method of claim 1, wherein receiving the data defining the plurality of firewall filter processing services comprises receiving data defining an optimization service as a stage of the execution engine pipeline, wherein the optimization service eliminates redundant firewall filter terms, removes firewall filter terms following terms that will always be satisfied, and removes firewall filter terms that will never be satisfied.

5. The method of claim 1, wherein receiving the data defining the plurality of firewall filter processing services comprises receiving data defining a comparison service as a stage of the execution engine pipeline, wherein the comparison service identifies modified terms, match conditions, and actions of a firewall filter that have been modified relative to firewall filters already programmed to the hardware, and passes only the modified terms, match conditions, and actions along for further processing of the execution engine pipeline and for subsequent programming to the hardware.

6. The method of claim 1, wherein receiving the data defining the plurality of firewall filter processing services comprises receiving data defining a conversion service as a final stage of the execution engine pipeline, wherein the conversion service converts the received firewall filter to an object format suitable for programming to the hardware of the network device.

7. The method of claim 1, wherein receiving the data defining the plurality of firewall filter processing services comprises receiving data defining an order comprising forked services such that the execution engine pipeline includes multiple sub-paths depending on output of at least one service of the plurality of firewall filter processing services.

8. The method of claim 1, further comprising publishing, by the execution engine pipeline, the processed firewall filter for consumption by a consumer.

9. The method of claim 8, wherein the network device comprises a multi-chassis router, wherein the execution engine pipeline is executed by a control plane of a switch card chassis of the network device, wherein programming the processed firewall filter comprises programming the processed firewall filter to a line card installed in a line card chassis of the network device, wherein the line card comprises the consumer.

10. The method of claim 9, wherein the network device comprises a plurality of hardware computing nodes configured to execute a distributed operating system, wherein the switch card chassis comprises a first one of the plurality of hardware computing nodes, and wherein the line card chassis comprises a second one of the plurality of hardware computing nodes.

11. The method of claim 1, wherein the network device comprises a plurality of hardware computing nodes configured to execute a distributed operating system, at least a first one of the plurality of hardware computing nodes comprising the execution engine pipeline, wherein programming the processed firewall filter comprises programming the processed firewall filter to at least a second one of the plurality of hardware computing nodes.

12. The method of claim 1, wherein processing the received firewall filter by the execution engine pipeline comprises using application programming interface (API) calls to access service modules of a service library for applying each of the plurality of firewall filter processing services.

13. The method of claim 1, wherein the received firewall filter comprises a first received firewall filter, the method further comprising prior to programming a second received firewall filter to the hardware of the network device for filtering the network traffic, processing the second received firewall filter by the execution engine pipeline;
  outputting, in response to processing the second received firewall filter, a notification indicating that processing the second received firewall filter has failed; and
  refraining from programming the second received firewall filter to the hardware of the network device.

14. A network device comprising:
  a plurality of hardware computing nodes configured to execute a distributed operating system, at least one of the plurality of hardware computing nodes configured to:
    receive data defining a plurality of firewall filter processing services, the data defining an order in which to apply, to a given firewall filter, each firewall filter processing service of the plurality of firewall filter processing services;
    configure, based on the received data, an execution engine pipeline to include the plurality of firewall filter processing services in the defined order;
    prior to programming a received firewall filter to hardware of the network device for filtering network traffic, process the received firewall filter by the execution engine pipeline by applying, to the received firewall filter, each of the plurality of firewall filter processing services in the defined order to produce a processed firewall filter; and
    program the processed firewall filter to the hardware for filtering the network traffic.

15. The network device of claim 14, wherein the data defining the plurality of firewall filter processing services comprises data defining a validation service as a first stage of the execution engine pipeline, wherein the validation service validates a match condition and corresponding action.

16. The network device of claim 14, wherein the data defining the plurality of firewall filter processing services comprises data defining an optimization service as a stage of the execution engine pipeline, wherein the optimization service eliminates redundant firewall filter terms, removes firewall filter terms following terms that will always be satisfied, and removes firewall filter terms that will never be satisfied.

17. The network device of claim 14, wherein the data defining the plurality of firewall filter processing services comprises data defining a comparison service as a stage of the execution engine pipeline, wherein the comparison service identifies modified terms, match conditions, and actions of a firewall filter that have been modified relative to firewall filters already programmed to the hardware, and passes only the modified terms, match conditions, and actions along for further processing of the execution engine pipeline and for subsequent programming to the hardware.

18. The network device of claim 14, wherein the data defining the plurality of firewall filter processing services comprises data defining a conversion service as a final stage of the execution engine pipeline, wherein the conversion service converts the received firewall filter to an object format suitable for programming to the hardware of the network device.

19. The network device of claim 14, at least a first one of the plurality of hardware computing nodes comprising the execution engine pipeline, wherein the network device programs the processed firewall filter to at least a second one of the plurality of hardware computing nodes.

20. A non-transitory computer-readable storage medium comprises instructions stored thereon that, when executed, cause one or more processors of a network device to:
  receive data defining a plurality of firewall filter processing services, the data defining an order in which to apply, to a given firewall filter, each firewall filter processing service of the plurality of firewall filter processing services;
  configure, based on the received data, an execution engine pipeline to include the plurality of firewall filter processing services in the defined order;
  prior to programming a received firewall filter to hardware of the network device for filtering network traffic, the received firewall filter by the execution engine pipeline by applying, to the received firewall filter, each of the plurality of firewall filter processing services in the defined order to produce a processed firewall filter; and
  program the processed firewall filter to the hardware for filtering the network traffic.

\* \* \* \* \*